US009063696B2

(12) United States Patent
Huang

(10) Patent No.: US 9,063,696 B2
(45) Date of Patent: Jun. 23, 2015

(54) FIXING MECHANISM AND RELATED ELECTRONIC DEVICE

(71) Applicant: Wistron Corporation, New Taipei (TW)

(72) Inventor: Hung-Ming Huang, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 155 days.

(21) Appl. No.: 14/034,563

(22) Filed: Sep. 24, 2013

(65) Prior Publication Data
US 2014/0153188 A1 Jun. 5, 2014

(30) Foreign Application Priority Data

Dec. 4, 2012 (TW) .............................. 101145443 A

(51) Int. Cl.
G06F 1/16 (2006.01)

(52) U.S. Cl.
CPC .................................... G06F 1/1626 (2013.01)

(58) Field of Classification Search
USPC ............. 174/541, 545, 101, 564; 361/679.01, 361/679.27, 679.21, 679.58, 679.34, 361/679.26, 679.39, 679.31, 679.02, 361/679.08, 679.43, 679.32, 679.33; 439/357, 326, 135, 417, 553, 607.33, 439/620.12, 157, 160, 259, 264, 136; 312/319.1, 223.2, 265.4, 306, 222, 312/333, 334.8, 326; 248/126, 299.1, 248/221.111, 49, 70, 121, 125.9, 221.12, 248/223.21; 16/346, 337, 340, 113.1, 438, 16/367, 321, 334
See application file for complete search history.

(56) References Cited

U.S. PATENT DOCUMENTS

| 6,287,128 | B1 * | 9/2001 | Jones et al. | 439/76.1 |
| 8,520,374 | B2 * | 8/2013 | Lin et al. | 361/679.06 |
| 2006/0023404 | A1 * | 2/2006 | Ling | 361/681 |
| 2014/0153188 | A1 * | 6/2014 | Huang | 361/679.58 |

* cited by examiner

Primary Examiner — Hung Duong
(74) Attorney, Agent, or Firm — Winston Hsu; Scott Margo

(57) ABSTRACT

A fixing mechanism includes a first engaging portion, a base, a first latch and a resilient component. The first engaging portion is disposed on a frame, the base is disposed on a casing, and the first latch is slidably disposed on the base. The first latch includes a first body, a second engaging portion and an inclined structure. The second engaging portion is disposed on the first body to engage with the first engaging portion, so as to constrain a movement of the frame relative to the casing. The inclined structure is disposed on the first body. The first engaging portion can slide relative to the inclined structure, so as to move the frame away from the casing. Two ends of the resilient component are respectively connected to the first latch and the base. The resilient component drives the second engaging portion to engage with the first engaging portion.

19 Claims, 7 Drawing Sheets

FIXING MECHANISM AND RELATED ELECTRONIC DEVICE

BACKGROUND OF THE INVENTION

1. Field of the Invention

The present invention relates to a fixing mechanism and a related electronic device, and more particularly, to a fixing mechanism capable of detachably fixing a screen of the tablet computer and a related electronic device.

2. Description of the Prior Art

With the advanced technology, the tablet computer is popular than the desktop computer and the notebook computer due to the convenience, and becomes the fashion product in the computer market. The tablet computer utilizes the touch panel to be the input device. For thin-typed design trend, the touch panel of the tablet computer is directly adhered on the casing to decrease a thickness of the product. The conventional manufacturing method utilizes the adhesive to dispose the touch panel on the casing. The adhesive has great viscosity. A tool is applied to prize a gap between the touch panel and the casing for disassembly of the touch panel and the casing, and then the adhesive is damaged by an external force to separate the touch panel from the casing. However, the conventional operation method is difficult, and part of the adhesive may be residual on the touch panel or the casing. The touch panel with the residual adhesive can not recycle, so that repairing cost of the tablet computer is increased due to the abandoned touch panel. Therefore, design of a fixing mechanism capable of stably fixing the touch panel and having advantages of easy disassembly is an important issue in the computer industry.

SUMMARY OF THE INVENTION

The present invention provides a fixing mechanism capable of detachably fixing a screen of the tablet computer and a related electronic device for solving above drawbacks.

According to the claimed invention, a fixing mechanism of fixing a panel module on a casing is disclosed. The panel module is disposed on a frame. The fixing mechanism includes a first engaging portion, a base, a first latch and a resilient component. The first engaging portion is disposed on the frame. The base is disposed on the casing. The first latch is slidably disposed on the base. The first latch includes a first body, a second engaging portion and an inclined structure. The second engaging portion is disposed on the first body. The second engaging portion is engaged with the first engaging portion to constrain a movement of the frame relative to the casing. The inclined structure is disposed on the first body and adjacent to the second engaging portion. The first engaging portion slides relative to the inclined structure when the first engaging portion is disassembled from the second engaging portion, so as to move the frame away from the casing. Two ends of the resilient component are respectively connected to the first latch and the base. The resilient component drives the second engaging portion to engage with the first engaging portion.

According to the claimed invention, the fixing mechanism further includes a button disposed on the first body.

According to the claimed invention, a distance between the second engaging portion and the inclined structure is substantially greater than a width of the first engaging portion.

According to the claimed invention, the fixing mechanism further includes a constraining component detachably disposed between the base and the first latch. The constraining component passes through the base and the first latch to constrain a movement of the first latch relative to the base.

According to the claimed invention, the fixing mechanism further includes a first buckling portion and at least one second latch. The first buckling portion is disposed on an edge of the frame different from the first engaging portion. The second latch is slidably disposed on an edge of the base different from the first latch. The second latch includes a second body and a second buckling portion. The second buckling portion is disposed on the second body. The second buckling portion is buckled with the first buckling portion.

According to the claimed invention, the fixing mechanism further includes an actuating component connected to the first latch and the second latch. The actuating component slides the second latch relative to the base when the first latch slides relative to the base.

According to the claimed invention, a slide direction of the first latch relative to the base is substantially perpendicular to a slide direction of the second latch relative to the base.

According to the claimed invention, the actuating component includes a first rack, a second rack and a gear. The first rack is disposed on the first latch. The second rack is disposed on the second latch. The gear is rotatably disposed on the base and respectively engaged with the first rack and the second rack.

According to the claimed invention, the actuating component includes a first inclined block and a second inclined block. The first inclined block is disposed on the first latch. The second inclined block is disposed on the second latch and slidably contacting against the first inclined block.

According to the claimed invention, an electronic device includes a frame, a panel module, a casing and a fixing mechanism. The panel module is disposed on the frame. The casing supports at least one electronic component. The fixing mechanism is disposed between the frame and the casing. The fixing mechanism includes a first engaging portion, a base, a first latch and a resilient component. The first engaging portion is disposed on the frame. The base is disposed on the casing. The first latch is slidably disposed on the base. The first latch includes a first body, a second engaging portion and an inclined structure. The second engaging portion is disposed on the first body. The second engaging portion is engaged with the first engaging portion to constrain a movement of the frame relative to the casing. The inclined structure is disposed on the first body and adjacent to the second engaging portion. The first engaging portion slides relative to the inclined structure when the first engaging portion is disassembled from the second engaging portion, so as to move the frame away from the casing. Two ends of the resilient component are respectively connected to the first latch and the base. The resilient component drives the second engaging portion to engage with the first engaging portion.

According to the claimed invention, the casing includes a first wedging portion disposed on an edge of the casing relative to the base. The frame comprises a second wedging portion disposed on an edge of the frame relative to the first engaging portion, and the second wedging portion is for wedging with the first wedging portion.

The fixing mechanism of the present invention utilizes a plurality of constraint mechanisms, such as the combination of the first engaging portion and the second engaging portion, the combination of the first buckling portion and the second buckling portion, and the combination of the first wedging portion and the second wedging portion, to stably constrain the movement of the frame relative to the casing. For disassembly of the panel module, the button can be driven to release the constraint of the first engaging portion and the second engaging portion. In the meantime the first latch can drive the second latch via the actuating component, so as to simultaneously release the constraint of the first buckling portion and the second buckling portion. Therefore, three edges between the frame and the casing are disconnected, and the frame can be rotated via the wedging portions to easily separate the frame and the panel module from the casing.

Structure of the panel module is not damaged when the fixing mechanism of the present invention is utilized to remove the panel module from the casing. The present invention for assembly of the panel module and the casing can be preferably applied to the tablet computer in place of the conventional adhesive method. The fixing mechanism of the present invention has advantages of light volume, easy operation and low manufacturing cost, and has benefit of preferred product yield of the thin-typed tablet computer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
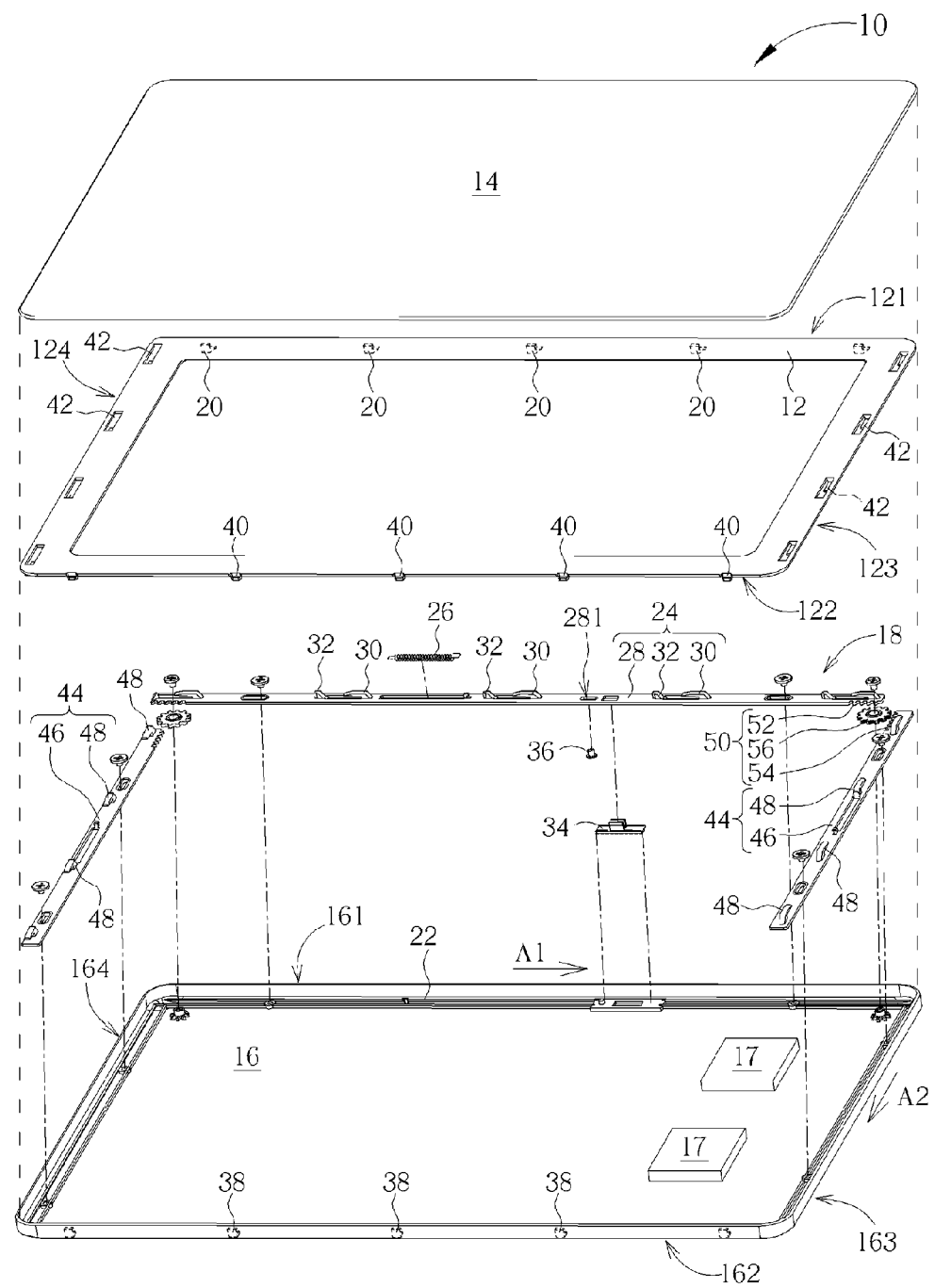
FIG. 1 is an exploded diagram of an electronic device according to an embodiment of the present invention.

Please refer to FIG. 1. FIG. 1 is an exploded diagram of an electronic device 10 according to an embodiment of the present invention. The electronic device 10 includes a frame 12, a panel module 14, a casing 16 and a fixing mechanism 18. Generally, the electronic device 10 can be a tablet computer or a smart phone. The panel module 14 can be a touch screen disposed on the frame 12. The casing 16 can support a plurality of electronic components 17, such as the hard disk, the processor, the memory module and so on. The fixing mechanism 18 is disposed between the frame 12 and the casing 16. The frame 12 can be assembled and disassembled rapidly by the fixing mechanism 18 of the present invention, so as to separate the panel module 14 from the casing 16.

As shown in FIG. 1, the fixing mechanism 18 includes a plurality of first engaging portions 20, a base 22, a first latch 24 and a resilient component 26. The first engaging portion 20 is disposed on a first edge 121 of the frame 12. The base 22 is fixed on a first edge 161 of the casing 16. The base 22 can include a plurality of slide tracks, and the first latch 24 is slidably disposed on the base 22 by the slide tracks. The first latch 24 includes a first body 28, a plurality of second engaging portions 30 and a plurality of inclined structures 32. Amounts of the second engaging portions 30 and the inclined structures 32 correspond to an amount of the first engaging portions 20. The second engaging portion 30 is disposed on the first body 28. Position of the second engaging portions 30 respectively correspond to position of the corresponding first engaging portions 20. Each inclined structure 32 is disposed on the first body 28 and adjacent to the corresponding second engaging portion 30. Two ends of the resilient component 26 are respectively connected to the first latch 24 and the base 22. A resilient recovering force of the resilient component 26 can move the first latch 24 to engage the second engaging portion 30 with the first engaging portion 20, so as to actuate constraint of the fixing mechanism 18.

In addition, the fixing mechanism 18 can further include a button 34 and a constraining component 36. The button 34 passes through the casing 16 and is disposed on the first body 28. A guiding slot 281 can be formed on the first body 28. An end of the constraining component 36 inserts into the guiding slot 281, and the first body 28 can move relative to the constraining component 36 within a short path. A length of the short path corresponds to a length of the sliding slot 281. The constraining component 36 is detachably disposed between the base 22 and the first latch 24. The constraining component 36 simultaneously passes through the base 22 and the first latch to constrain a relative movement between the first latch 24 and the base 22 via structural interference, so as to prevent the fixing mechanism 18 from actuation due to accident knock of the button 34. The button 34 can cover above the constraining component 36 to perform artistic appearance of the electronic device 10. The button 34 can be moved to expose the constraining component 36, and the button 34 can further be pushed continuously after the constraining component 36 is removed, so as to release the constraint of the fixing mechanism 18.

Figure 2:
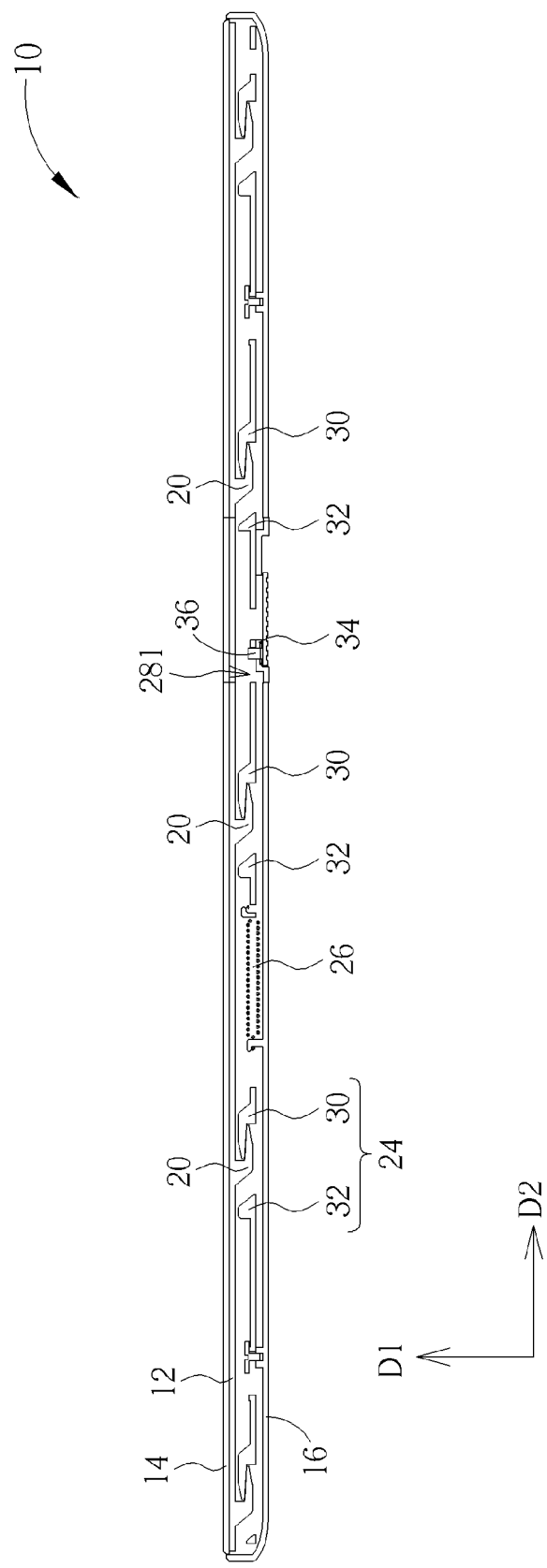
FIG. 2 to FIG. 4 respectively are sectional views of the electronic device in different operational modes according to the embodiment of the present invention.
Figure 3:
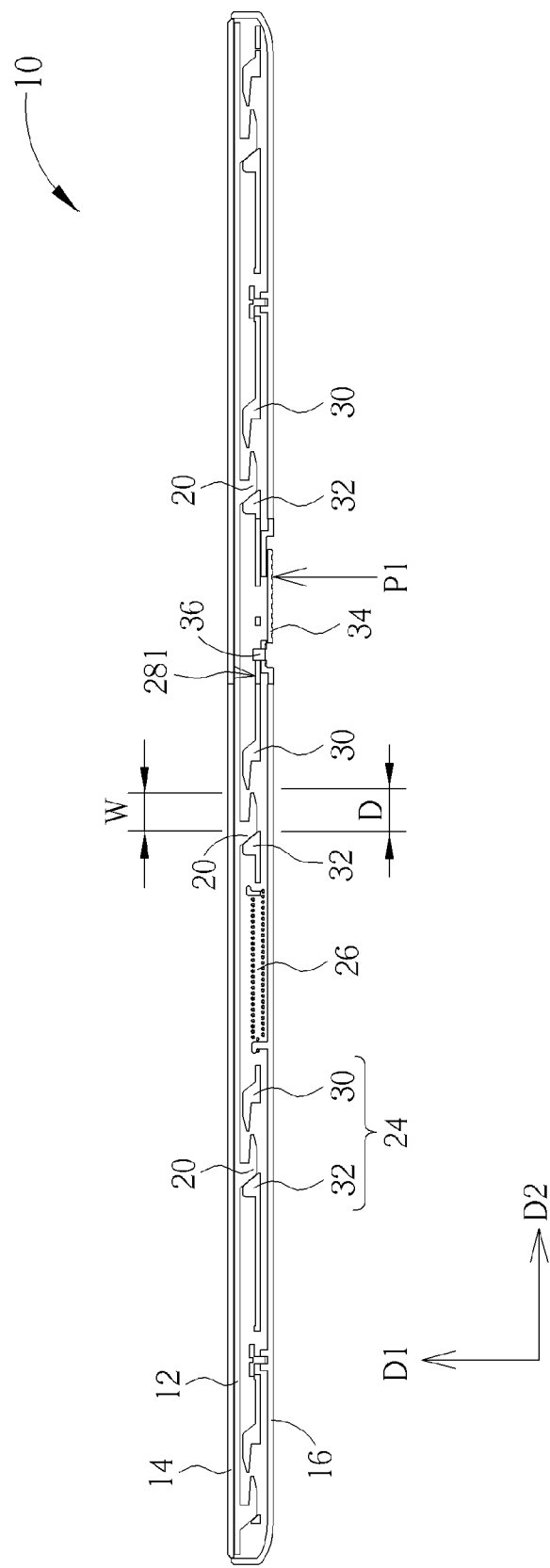
Figure 4:
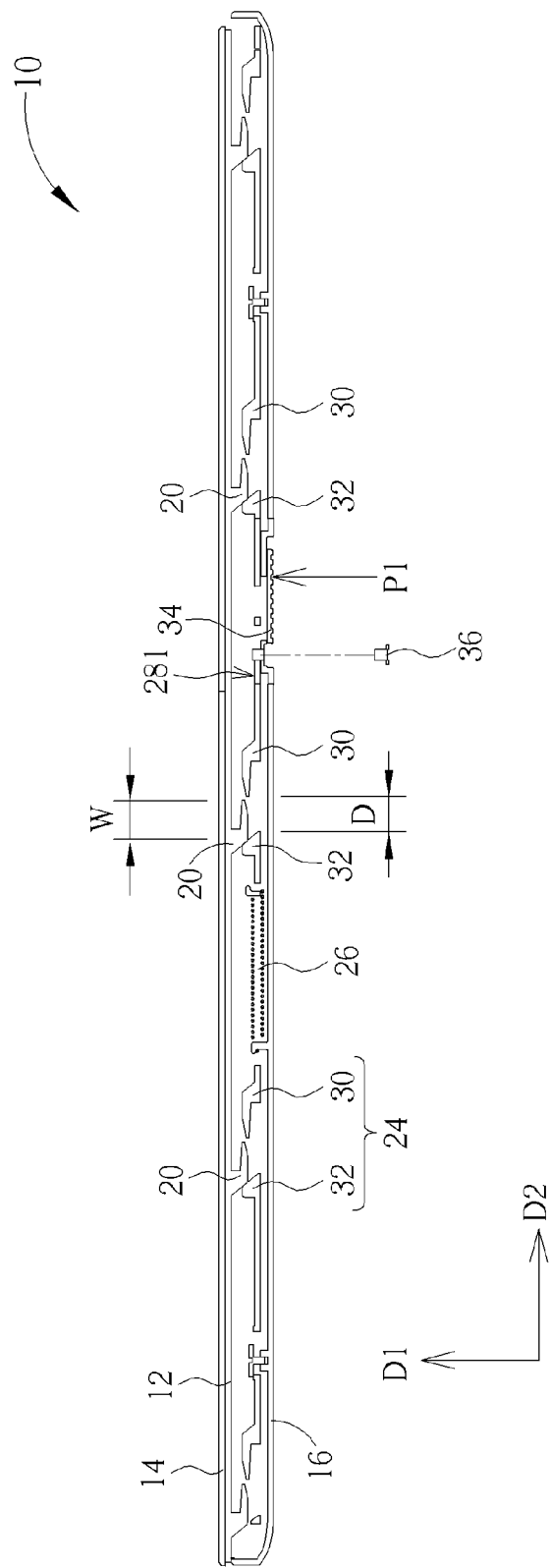

Please refer to FIG. 1 to FIG. 4. FIG. 2 to FIG. 4 respectively are sectional views of the electronic device 10 in different operational modes according to the embodiment of the present invention. As shown in FIG. 2, the resilient component 26 drives the second engaging portion 30 to engage with the first engaging portion 20, so as to prevent the frame 12 and the casing 16 from separation at a first direction D1. The constraining component 36 passes through the casing 16 to lock on the first latch 24, which can prevent the frame 12 and the casing 16 from separation at a second direction D2 perpendicular to the first direction D1. Meanwhile, the button 34 is located at an initial position to cover the constraining component 36. As shown in FIG. 3, the button 34 moves to the first position P1 at the second direction D2, to slide the first latch 24 relative to the base 22 at the second direction D2 until an end (the left end) of the guiding slot 281 contacts against the constraining component 36. Thus, the first latch 24 is motionless, the first engaging portion 20 is disassembled from the second engaging portion 30 and contacts against a bottom of the inclined structure 32.

Final, as shown in FIG. 4, the button 34 can move to the second position P2 at the second direction D2 after the constraining component 36 is removed. The inclined structure 32 can slide relative to the first engaging portion 20, and the frame 12 can be lifted with movement of the first engaging portion 20, so as to space the panel module 14 and the frame 12 from the casing 16. A distance between the front end of the second engaging portion 30 and the inclined structure 32 can be substantially greater than a width W of the first engaging portion 20, so that the first engaging portion 20 can slide relative to the inclined structure 32 to be immediately lifted when the first engaging portion 20 is disassembled from the second engaging portion 30. Therefore, the fixing mechanism 18 of the present invention can simultaneously lift the frame 12 and the panel module 14 when the constraint of the engaging portions is released for convenient assembly and disassembly.

As shown in FIG. 1, the casing 16 can include a plurality of wedging portions 38 disposed on a second edge 162 of the casing 16 relative to the base 22. The frame 12 can include a plurality of second wedging portions 40 disposed on a second edge 122 of the frame 12 relative to the first engaging portion 20. For assembly of the frame 12 and the casing 16, each second wedging portion 40 can be wedged with the corresponding first wedging portion 38, the frame 12 can be rotated via the wedging portions, and the first edge 121 of the frame 12 can contact the first edge 161 of the casing 16, so that the fixing mechanism 18 can be actuated to engage the second engaging portion 30 with the first engaging portion 20 for movement constraint of the frame 12 relative to the casing 16.

Besides, the fixing mechanism 18 of the present invention can further include a plurality of first buckling portions 42 and two second latches 44. The plurality of first buckling portions 42 is respectively disposed on the third edge 123 and the fourth edge 124 of the frame 12 different from the first engaging portion 20. The second latches 44 can be slidably disposed on the base 22, and respectively correspond to the edge 163 and the edge 164 of the casing 16 different from the first latch 24. Each second latch 44 includes a second body 46 and a plurality of second buckling portions 48. Each second buckling portion 48 is disposed on the second body 46 and corresponds to the corresponding first buckling portion 42. A slide direction A1 of the first latch 24 relative to the base 22 can be substantially perpendicular to a slide direction A2 of the second latch 44 relative to the base 22. Thus, the four edges of the frame 12 and the casing 16 can be rapidly assembled via the constraint of the fixing mechanism 18 and the combination of the first wedging portions 38 and the second wedging portions 40.

The fixing mechanism 18 can further include an actuating component 50 connected to the first latch 24 and the second latch 44. The actuating component 50 can be a bridging unit. As the first latch 24 slides relative to the base 22, the first latch 24 can simultaneously slide the second latch 44 relative to the base 22 via the actuating component 50. The second engaging portion 30 and the second buckling portion 48 can be assembled with and disassemble from the first engaging portion 20 and the first buckling portion 42 simultaneously for the convenient assembly and disassembly of the frame 12 and the panel module 14.

Figure 5:
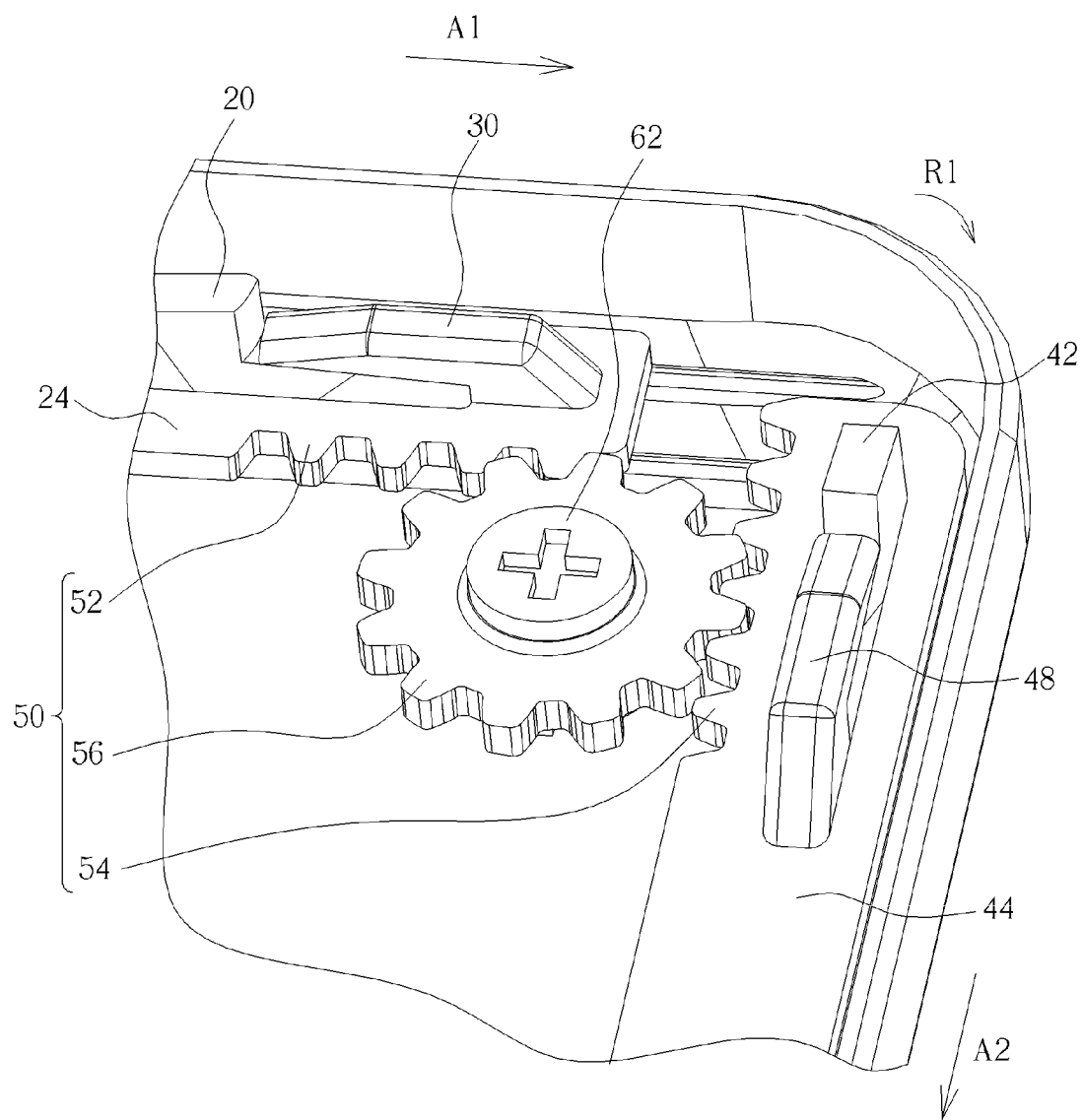
FIG. 5 and FIG. 6 respectively are diagrams of an actuating component in different operational modes according to a first embodiment of the present invention.
Figure 6:
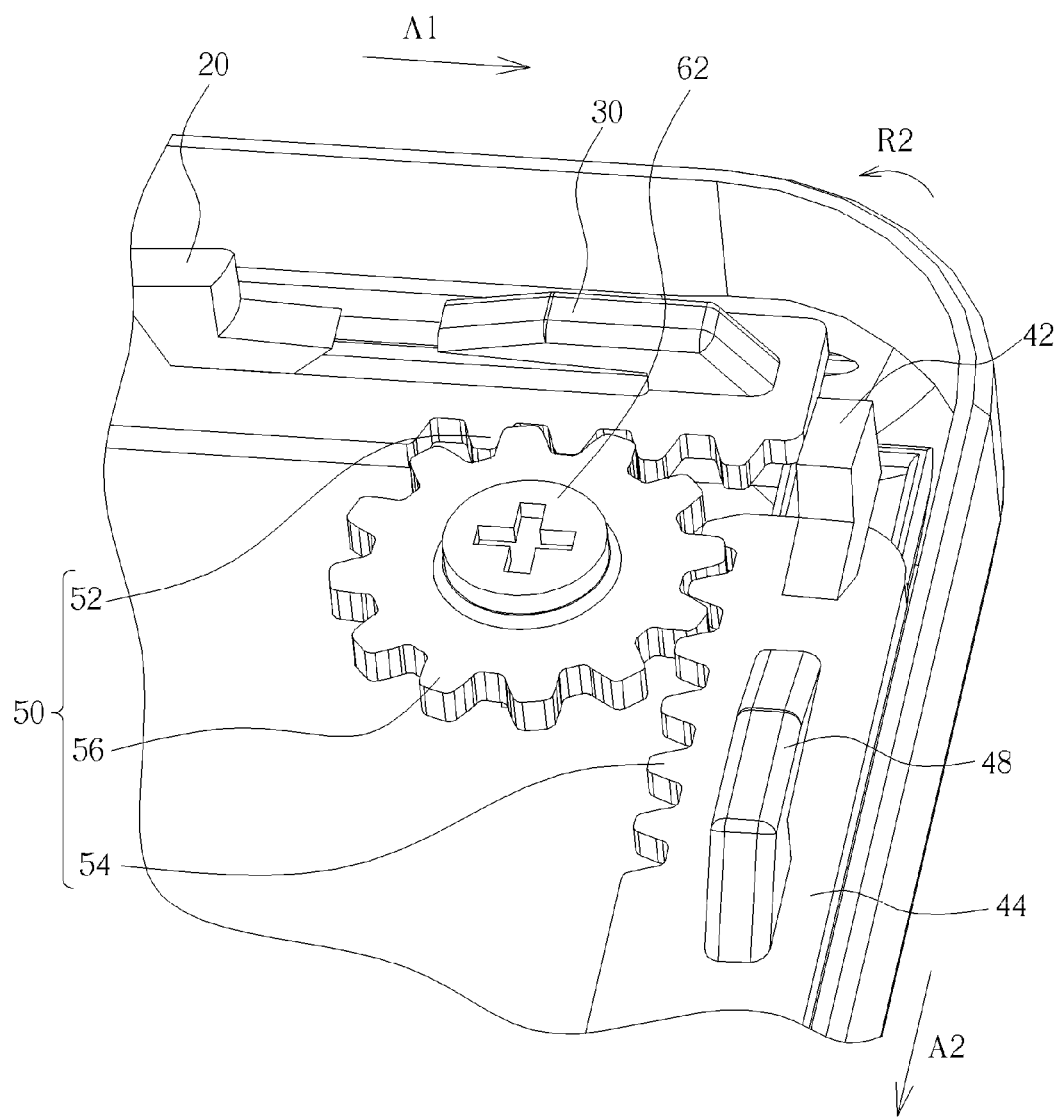

Please refer to FIG. 1, FIG. 5 and FIG. 6. FIG. 5 and FIG. 6 respectively are diagrams of the actuating component 50 in different operational modes according to a first embodiment of the present invention. The actuating component 50 can include a first rack 52, a second rack 54 and a gear 56. The first rack 52 and the second rack 54 are respectively disposed on the first latch 24 and the second latch 44. The gear 56 is rotatably disposed on a boss 62 of the base 22, and is respectively engaged with the first rack 52 and the second rack 54. The actuating component 50 can drive the first latch 24 and the second latch 44 to simultaneously slide relative to the base 22 at different directions.

As shown in FIG. 5 to FIG. 6, the second buckling portion 30 is separated from the first buckling portion 20 when the first latch 24 moves at the slide direction A1. The first latch 24 rotates the gear 56 at the clockwise direction R1 via the first rack 52, and the gear 56 further drives the second rack 54 to move the second latch 44 at the slide direction A2, so as to separate the second buckling portion 48 from the first buckling portion 42. As shown in FIG. 6 to FIG. 5, the second engaging portion 30 is engaged with the first engaging portion 20 when the first latch 24 moves at a direction opposite to the slide direction A1. The gear 56 rotates at the counterclockwise direction R2 to move the second latch 44 at a direction opposite to the slide direction A2, and to buckle the second buckling portion 48 with the first buckling portion 42. It is to say, the actuating component 50 can drive the second engaging portion 30 and the second buckling portion 48 to simultaneously assemble with and disassemble from the first engaging portion 20 and the first buckling portion 42.

Figure 7:
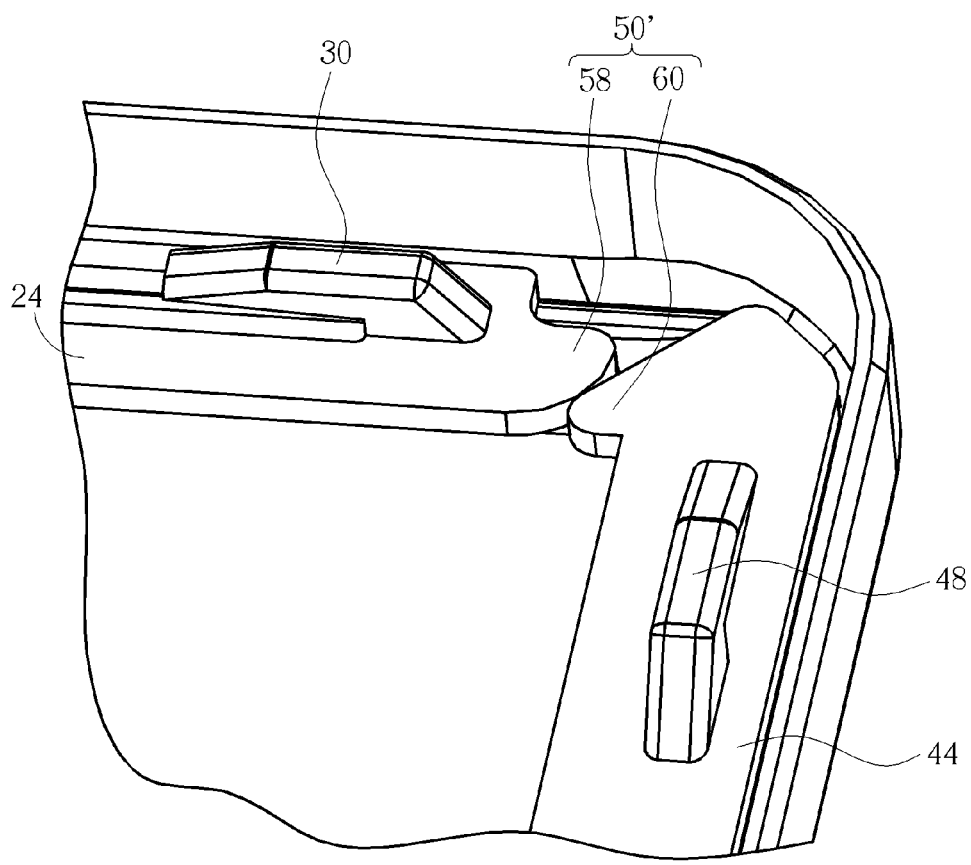
FIG. 7 is a diagram of the actuating component according to a second embodiment of the present invention.

Please refer to FIG. 7. FIG. 7 is a diagram of the actuating component 50' according to a second embodiment of the present invention. The actuating component 50' can further include a first inclined block 58 and a second inclined block 60. The first inclined block 58 and the second inclined block 60 are respectively disposed on the first latch 24 and the second latch 44, and the second inclined block 60 can slidably contact against the first inclined block 58. As the first latch 24 moves relative to the base 22, the first inclined block 58 can slide relative to the second inclined block 60 to push the second latch 44. Thus, the fixing mechanism 18 can utilize the actuating component 50' to simultaneously move the first latch 24 and the second latch 44 relative to the base 22, so as to actuate and release the constraint of the fixing mechanism 18. Operational procedures of the second embodiment are the same as ones of the first embodiment, and detailed description is omitted herein for simplicity. Application of the actuating component of the present invention is not limited to the above-mentioned embodiments, and depends on design demand.

In conclusion, the fixing mechanism of the present invention utilizes a plurality of constraint mechanisms, such as the combination of the first engaging portion and the second engaging portion, the combination of the first buckling portion and the second buckling portion, and the combination of the first wedging portion and the second wedging portion, to stably constrain the movement of the frame relative to the casing. For disassembly of the panel module, the button can be driven to release the constraint of the first engaging portion and the second engaging portion. In the meantime the first latch can drive the second latch via the actuating component, so as to simultaneously release the constraint of the first buckling portion and the second buckling portion. Therefore, three edges between the frame and the casing are disconnected, and the frame can be rotated via the wedging portions to easily separate the frame and the panel module from the casing.

Comparing to the prior art, structure of the panel module is not damaged when the fixing mechanism of the present invention is utilized to remove the panel module from the casing. The present invention for assembly of the panel module and the casing can be preferably applied to the tablet computer in place of the conventional adhesive method. The fixing mechanism of the present invention has advantages of light volume, easy operation and low manufacturing cost, and has benefit of preferred product yield of the thin-typed tablet computer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A fixing mechanism of fixing a panel module on a casing, the panel module being disposed on a frame, the fixing mechanism comprising:
a first engaging portion disposed on the frame;
a base disposed on the casing; and
a first latch slidably disposed on the base, the first latch comprising:
a first body;
a second engaging portion disposed on the first body, the second engaging portion being engaged with the first engaging portion to constrain a movement of the frame relative to the casing; and an inclined structure disposed on the first body and adjacent to the second engaging portion, the first engaging portion sliding relative to the inclined structure when the first engaging portion is disassembled from the second engaging portion, so as to move the frame away from the casing; and a resilient component, two ends of the resilient component being respectively connected to the first latch and the base, the resilient component driving the second engaging portion to engage with the first engaging portion.

2. The fixing mechanism of claim 1, further comprising:
a button disposed on the first body.

3. The fixing mechanism of claim 1, wherein a distance between the second engaging portion and the inclined structure is substantially greater than a width of the first engaging portion.

4. The fixing mechanism of claim 1, further comprising:
a constraining component detachably disposed between the base and the first latch, the constraining component passing through the base and the first latch to constrain a movement of the first latch relative to the base.

5. The fixing mechanism of claim 1, further comprising:
a first buckling portion disposed on an edge of the frame different from the first engaging portion; and
at least one second latch slidably disposed on an edge of the base different from the first latch, the second latch comprising:
a second body; and
a second buckling portion disposed on the second body, the second buckling portion being buckled with the first buckling portion.

6. The fixing mechanism of claim 5, further comprising:
an actuating component connected to the first latch and the second latch, the actuating component sliding the second latch relative to the base when the first latch slides relative to the base.

7. The fixing mechanism of claim 5, wherein a slide direction of the first latch relative to the base is substantially perpendicular to a slide direction of the second latch relative to the base.

8. The fixing mechanism of claim 6, wherein the actuating component comprises:
a first rack disposed on the first latch;
a second rack disposed on the second latch; and
a gear rotatably disposed on the base and respectively engaged with the first rack and the second rack.

9. The fixing mechanism of claim 6, wherein the actuating component comprises:
a first inclined block disposed on the first latch; and
a second inclined block disposed on the second latch and slidably contacting against the first inclined block.

10. An electronic device comprising:
a frame;
a panel module disposed on the frame;
a casing for supporting at least one electronic component; and
a fixing mechanism disposed between the frame and the casing, the fixing mechanism comprising:
a first engaging portion disposed on the frame;
a base disposed on the casing; and
a first latch slidably disposed on the base, the first latch comprising:
a first body;
a second engaging portion disposed on the first body, the second engaging portion being engaged with the first engaging portion to constrain a movement of the panel module relative to the casing; and
an inclined structure disposed on the first body and adjacent to the second engaging portion, the first engaging portion sliding relative to the inclined structure when the first engaging portion is disassembled from the second engaging portion, so as to move the panel module away from the casing; and
a resilient component, two ends of the resilient component being respectively connected to the first latch and the base, the resilient component driving the second engaging portion to engage with the first engaging portion.

11. The electronic device of claim 10, wherein the fixing mechanism further comprises:
a button disposed on the first body.

12. The electronic device of claim 10, wherein a distance between the second engaging portion and the inclined structure is substantially greater than a width of the first engaging portion.

13. The electronic device of claim 10, wherein the fixing mechanism further comprises:
a constraining component detachably disposed between the base and the first latch, the constraining component passing through the base and the first latch to constrain a movement of the first latch relative to the base.

14. The electronic device of claim 10, wherein the fixing mechanism further comprises:
a first buckling portion disposed on an edge of the frame different from the first engaging portion; and
at least one second latch slidably disposed on an edge of the base different from the first latch, the second latch comprising:
a second body; and
a second buckling portion disposed on the second body, the second buckling portion being buckled with the first buckling portion.

15. The electronic device of claim 14, wherein the fixing mechanism further comprises:
an actuating component connected to the first latch and the second latch, the actuating component sliding the second latch relative to the base when the first latch slides relative to the base.

16. The electronic device of claim 14, wherein a slide direction of the first latch relative to the base is substantially perpendicular to a slide direction of the second latch relative to the base.

17. The electronic device of claim 15, wherein the actuating component comprises:
a first rack disposed on the first latch;
a second rack disposed on the second latch; and
a gear rotatably disposed on the base and respectively engaged with the first rack and the second rack.

18. The electronic device of claim 15, wherein the actuating component comprises:
a first inclined block disposed on the first latch; and
a second inclined block disposed on the second latch and slidably contacting against the first inclined block.

19. The electronic device of claim 10, wherein the casing comprises a first wedging portion disposed on an edge of the casing relative to the base, the frame comprises a second wedging portion disposed on an edge of the frame relative to the first engaging portion, and the second wedging portion is for wedging with the first wedging portion.

* * * * *